United States Patent [19]

Kokaji

[11] 4,163,979

[45] Aug. 7, 1979

[54] METHOD AND APPARATUS FOR RECORDING LATENT IMAGES ON A MAGNETIC MEDIUM IN MAGNETOGRAPHY

[75] Inventor: Norio Kokaji, Tokyo, Japan

[73] Assignee: Iwatsu Electric Co., Ltd., Japan

[21] Appl. No.: 818,453

[22] Filed: Jul. 25, 1977

[30] Foreign Application Priority Data

Jul. 28, 1976 [JP] Japan .................... 51-90006
Mar. 14, 1977 [JP] Japan .................... 52-27845

[51] Int. Cl.[2] .................. G03G 19/00; G01D 15/12
[52] U.S. Cl. .................. 346/74.1; 358/301
[58] Field of Search .................. 346/74.1; 358/301

[56] References Cited

U.S. PATENT DOCUMENTS

| | | | |
|---|---|---|---|
| 2,826,634 | 3/1958 | Atkinson | 358/301 |
| 2,924,653 | 2/1960 | Fairchild | 358/301 |
| 3,108,281 | 10/1963 | Uemura | 358/301 |
| 3,637,934 | 1/1972 | Brewster | 358/301 |
| 4,034,409 | 7/1977 | Levy | 358/301 |
| 4,051,484 | 9/1977 | Martin | 346/74.1 |

*Primary Examiner*—Jay P. Lucas
*Attorney, Agent, or Firm*—Paul & Paul

[57] ABSTRACT

Disclosed is a method and apparatus for carrying out Magnetography utilizing the relationship between half-tones of a picture and the spatial recording density on a magnetic recording material. The picture signal is converted into an electrical signal, whose frequency corresponds to the half-tones of the picture and results in the variation of the spatial recording density so that the naturalness of the half-tones of the picture is successfully preserved.

3 Claims, 12 Drawing Figures

Fig. 1(a)
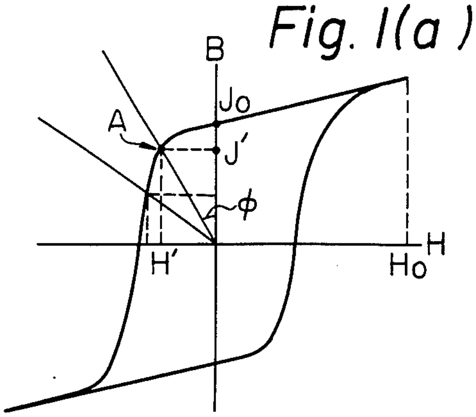
Fig. 1(b)
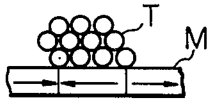
Fig. 1 (c)
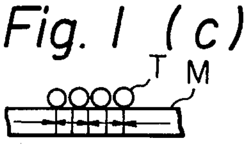
Fig. 3(a)
| INPUT | | | OUTPUT | | | | | |
|---|---|---|---|---|---|---|---|---|
| TONE | | VOLTAGE | a | b | c | d | e | f |
| DEEP BLACK | 1 | 4.2 ~ 5 V | 0 | 1 | 1 | 1 | 1 | 1 |
| HALF-TONES | 2 | 3.3~4.2 V | 1 | 0 | 1 | 1 | 1 | 1 |
| | 3 | 2.5~3.3V | 1 | 1 | 0 | 1 | 1 | 1 |
| | 4 | 1.7~2.5V | 1 | 1 | 1 | 0 | 1 | 1 |
| | 5 | 0.83~1.7V | 1 | 1 | 1 | 1 | 0 | 1 |
| WHITE | 6 | 0 ~ 0.83V | 1 | 1 | 1 | 1 | 1 | 0 |
Fig. 3(b)
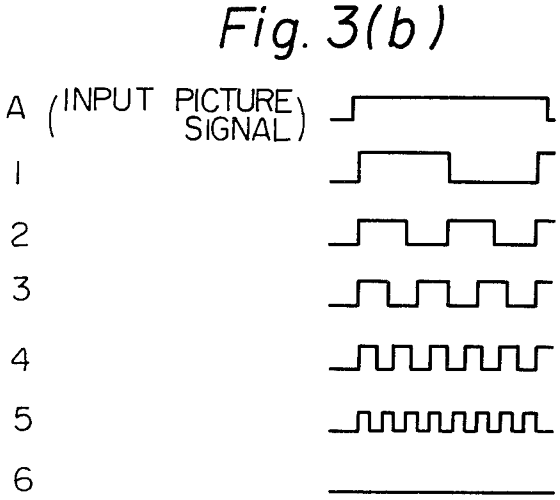

METHOD AND APPARATUS FOR RECORDING LATENT IMAGES ON A MAGNETIC MEDIUM IN MAGNETOGRAPHY

BACKGROUND OF THE INVENTION

This invention relates to a method and apparatus for recording magnetic latent images on a medium utilizing Magnetography and, particularly, to the obtaining of natural half-tones by such a method.

Magnetography is a method for forming magnetic latent images on a recording medium by a recording head, turning said latent images into visible images with the use of magnetic toners and, further, if it is necessary, printing said visible images on a printing paper to make a hard copy of pictures.

Research and development into making practicable use of Magnetography has not been successful, although Magnetography has been regarded as a potential alternative to Xerography. One of the difficulties involved in making practicable use of Magnetography resides in the fact that it is not easy to obtain a reproduced copy having half-tones, particularly natural half-tones. Possible solutions for this problem, such as a method of varying the recording current of a recording head in accordance with the tones of the picture, or of using a recording head having a V-shaped gap, have been proposed (Japanese Patent Publication Sho. 38-13730). The method of using a recording head having a V-shaped gap utilizes the characteristic of the variation of the size of a recorded dot in accordance with the intensity of the recording current. However, practically speaking, it is difficult to obtain natural half-tones or so-called actual photographic half-tones having the characteristic of continuity of tone by either the V-shaped gap method or the other proposed method mentioned above.

SUMMARY OF THE INVENTION

As a different solution, than those mentioned above, for the problem of half-tones, the basic concept according to the present invention is that the change of half-tones is converted into a change of spatial recording density, the change of recording density is converted into a change of residual magnetization and the change of residual magnetization is converted into a change of quantity of toners attracted to the magnetic recording medium. The spatial recording mentioned above is represented by the number of signal bits per unit length (e.g. bits/mm).

For a better understanding of the present invention, a B-H curve for magnetic material might be referred to. The amount of residual magnetization is determined at the point where the B-H curve for the period of decreasing H, applying a magnetic force sufficient for magnetic saturation, is crossed by a straight line passing through the origin of the coordinates with an angle $\phi$ from the B-axis. In a B-H curve the following relations exist.

$$\phi = \tan^{-1}(N/\mu_o)$$

N:demagnetizing factor $\mu_o$:permeability for vacuum

The above relations can be understood with the aid of FIG. 1(*a*), enclosed with this specification, which shows a diagram of the magnetic characteristic of a magnetic recording medium. In FIG. 1(*a*) the amount of residual magnetization is J'. As the recording density increases, the demagnetizing factor N in the above equation increases, which causes the angle $\phi$ to increase. As the angle $\phi$ increases, the crossing point between the B-H curve and the straight line represented by the above equation moves downwardly along the B-H curve in the second quadrant, which causes the residual magnetization J' to decrease. The strength of the residual magnetization determines the amount of magnetic toner attracted to the magnetic poles on the recording medium. Models explaining the relationship between the spatial recording density and the amount of magnetic toner T attracted to the magnetic poles on the recording medium M are illustrated in FIG. 1(*b*) and (*c*) enclosed with this specification. In these figures the model (b) corresponds to a relatively low spatial recording density and the model (c) corresponds to a relatively high spatial density. The arrow shown in these figures represents the magnitude and the direction of the residual magnetization. In FIG. 1(*c*) both the interval of the reversal of the direction of magnetization and the residual magnetization is smaller than in FIG. 1(*b*), so that the amount of toner attracted to the recording medium is smaller in FIG. 1(*c*) than in FIG. 1(*b*).

Therefore, the half-tones of a picture are represented by the amount of toner, so that naturalness of picture is preserved, i.e. the natural half-tones, or so-called actual photographic half-tones, are attained. The half-tones obtained by the method of the present invention are essentially different from the screened half-tones.

Therefore, it is an object of the present invention to provide a method and apparatus for carrying out Magnetography which is suitable for practical use.

It is another object of the present invention to provide a method and apparatus for obtaining natural half-tones, or so-called actual photographic half-tones, having the characteristic of continuity of half-tone.

It is another object of the present invention to utilize the relationship between recording density and residual magnetization for carrying out Magnetography.

It is a further object of the present invention to ensure the stability of tones even when a gap between a recording head and a recording medium may vary by the utilization of the relationship between recording density and residual magnetization as described above.

It is a still further object of the present invention to ensure the attraction of a magnetic toner on a magnetic latent image, even when the recording density becomes small, by means of setting up an upper reference voltage in a method and apparatus utilizing the relationship between recording density and residual magnetization as described above.

The aforementioned and other objects of the invention will become more apparent from the following description with reference to accompanying drawings.

BRIEF DESCRIPTION OF THE DRAWINGS

FIG. 1(*a*) is a diagram of the magnetic characteristic of a magnetic recording medium.

FIGS. 1(*b*) and (*c*) are models of toners attracted on a magnetic recording medium.

FIGS. 3(*a*)(*b*) show the relationship between half-tones and electrical signals used in the circuit of FIG. 2.

DESCRIPTION OF THE PREFERRED EMBODIMENTS

Figure 2:
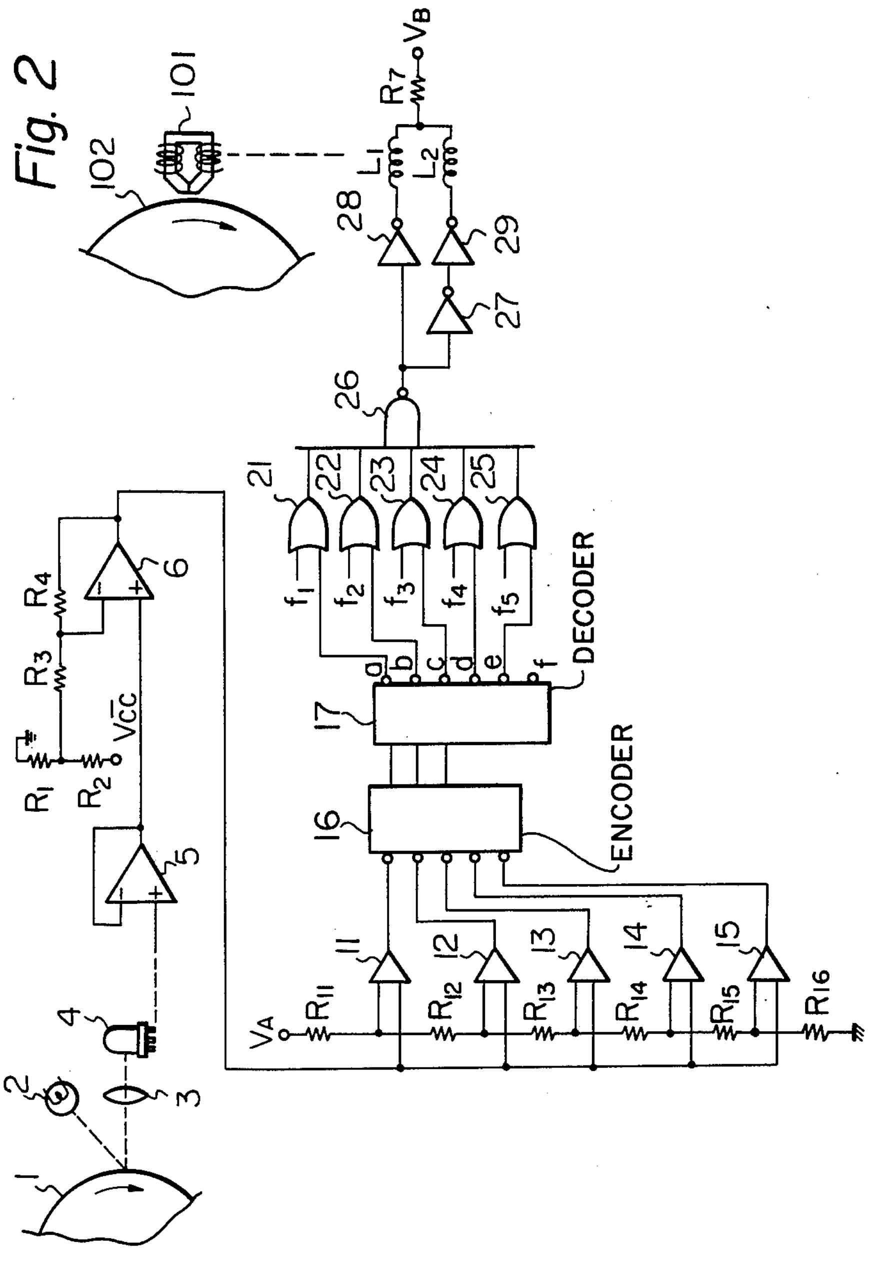
FIG. 2 is an example of a circuit diagram of an apparatus according to the present invention.

FIG. 2 is an example of a circuit diagram of the apparatus according to the present invention. Referring to FIG. 2, an original picture, arranged on the periphery of drum 1 revolving in the direction of the arrow show, is scanned by a light beam. The signal of said light beam is transformed into an electrical signal by the system of a lens 3 and photomultiplier tube 4. The electrical signal is amplified by an amplifier, consisting of operational amplifiers 5, 6 and resistors $R_1$, $R_2$, $R_3$, $R_4$, to produce an input picture signal of appropriate voltage. Thus, the voltage of input signal corresponds to the half-tones of the scanned picture.

The input picture signal is compared at comparators 11 through 15 with reference voltages formed by a voltage source $V_A$ and resistors $R_{11}$ through $R_{16}$. As a result of this comparison, each of the comparators 11 through 15 produces a binary signal "1" or "0". The outputs of the comparators are applied through an encoder 16 to a decoder 17. One of the outputs, a through f, of the decoder 17 produces a binary signal "0", according to the half-tone of the picture. For example, the half-tones of a picture are classified into six grades, i.e. grade 6 for white, grade 5 for slightly black, grade 4 for a little more black, grade 3 for middle black, grade 2 for more black, grade 1 for deep black. The grades 1, 2, 3, 4, 5 and 6 correspond to the voltage ranges 0–0.83V, 0.83–1.7V, 1.7–2.5V, 2.5–3.3V, 3.3–4.2V and 4.2–5V, respectively, as shown in FIG. 3(*a*). The truth table in FIG. 3(*a*) shows the relationship between input picture signal and outputs, a through f, of the decoder 17.

Referring again to FIG. 2, pulses having different frequencies $f_1$, $f_2$, $f_3$, $f_4$ and $f_5$, where $f_5>f_4>f_3>f_2>f_1$, are supplied to one of two outputs of negative AND gates 21, 22, 23, 24 and 25, respectively. The other inputs of the negative AND gates 21 through 25 receive the outputs of the decoder 17. As a result of the logic operation in negative AND gates 21 through 25, one of the five pulses of different frequencies, $f_1$ through $f_5$, is applied to the input of an NAND gate 26. Then the output of the NAND gate 26 is applied to coils $L_1$, $L_2$ of a recording head 101, via a driver 28, inverter 27 and driver 29. The intensity of the current through the coils $L_1$, $L_2$ is dependent on a resistor $R_7$ connected between the coils $L_1$, $L_2$ and a voltage source $V_B$.

FIG. 3(*b*) indicates the wave forms of magnetizing signals on the coil of the recording head. Wve forms 1, 2, 3, 4, 5 and 6 correspond to half-tone numbers 1 through 6, respectively, in FIG. 3(*a*).

As the frequency of the magnetizing signal becomes lower, both the interval of the reversal of the direction of magnetization and the magnitude of residual magnetization becomes greater, which causes the amount of toner attracted to the recording medium to increase. For assistance in understanding of the manner of magnetization, the models shown in FIG. 1(*b*) and (*c*) will be useful.

Figure 4:
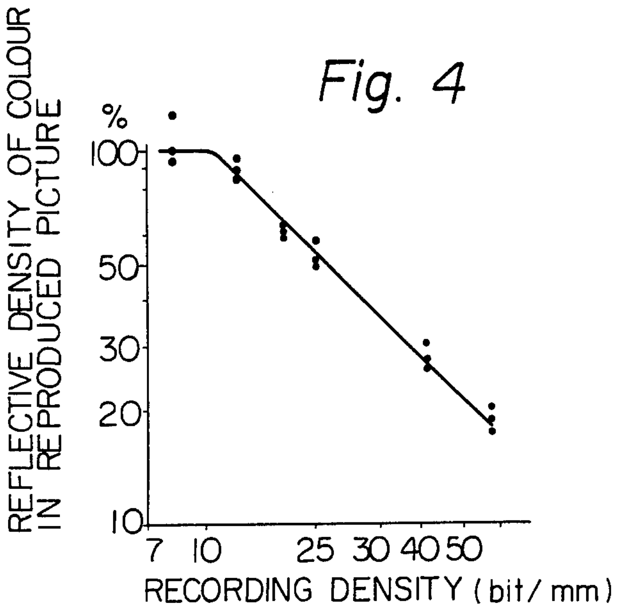
FIG. 4 and FIG. 5 are diagrams showning the results of experiments concerning the present invention.
Figure 5:
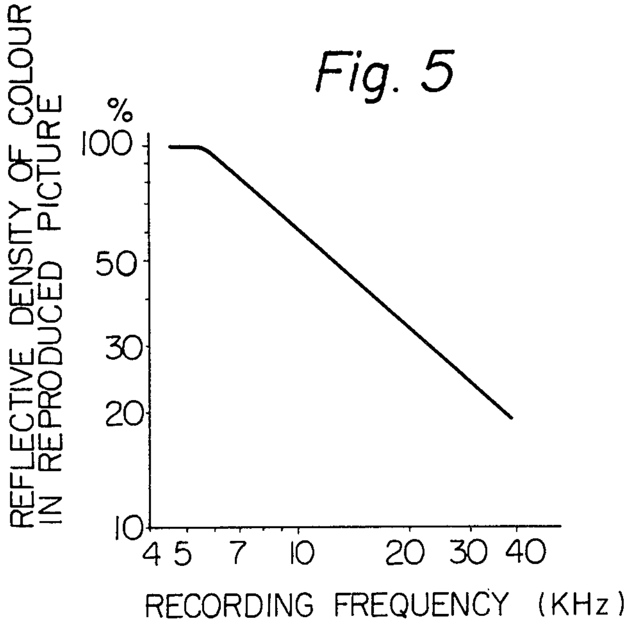

The results of experiments which were conducted to demonstrate the principle of the present invention and the performance of the apparatus of FIG. 2 are shown in FIG. 4 and FIG. 5. In these experiments, a magnetic gilding material, Co—Ni—P, protected by a non-magnetic gilding material, Ni—P, was used as a magnetic recording medium.

The relationship between the reflective density of colour in a reproduced picture and the recording density is shown in FIG. 4, and the relationship between the reflective density of colour in a reproduced picture and the recording frequency is shown in FIG. 5. Both FIG. 4 and FIG. 5 indicate the linear relationship between the reflective density of colour of a reproduced picture and either the recording density or the recording frequency.

Figure 6:
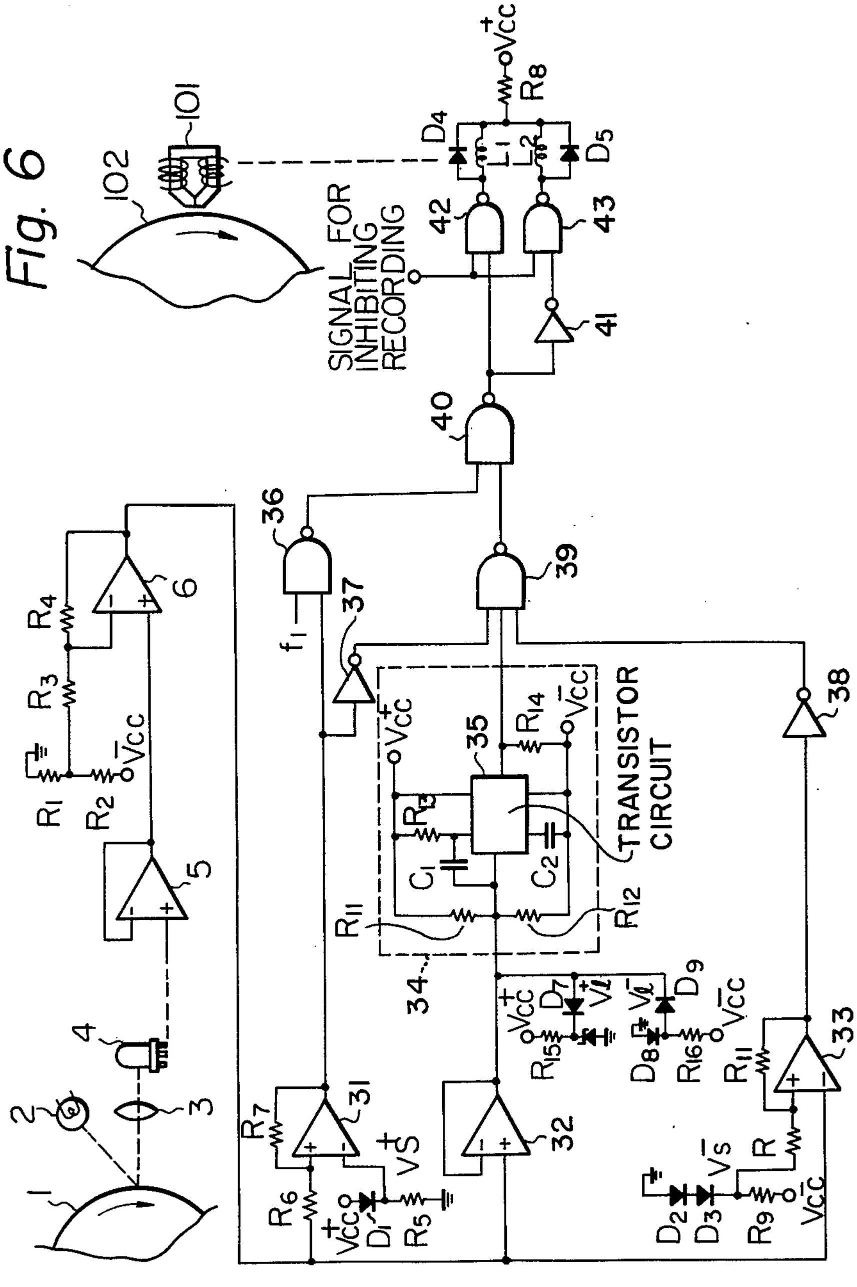
FIG. 6 is another example of a circuit diagram of an apparatus according to the present invention.

FIG. 6 shows another emample of an apparatus according to the present invention. With the apparatus indicated in FIG. 6, input signals can be obtained in the same way as with the apparatus indicated in FIG. 2. Referring to FIG. 6, the input picture signal is applied in parallel to first comparing circuit, consisting of a comparator 31, resistors $R_5$, $R_6$, $R_7$ and diode $D_1$, to a voltage follower 32 and to a second comparing circuit consisting of a comparator 33, resistors $R_9$, $R_{10}$, $R_{11}$ and diodes $D_2$, $D_3$.

When the input picture signal represents a tone of deep black and is greater than a predetermined voltage, the above mentioned first comparing circuit opens a gate 36 and closes a gate 39, simultaneously, with the aid of an inverter 37. The gate 36 then produces at its output pulses of the frequency $f_1$ which are sent to a gate 40.

When the input picture signal represents a tone of white and is smaller than a predetermined voltage, the above mentioned second comparing circuit closes a gate 39 with the aid of an inverter 38.

The input picture signal through voltage follower 32 is transformed into pulses of the frequency corresponding the voltage of the picture signal by a voltage-to-frequency converter 34. The pulses produced by the voltage-to-frequency converter 34 are applied to the gate 39 and are transmitted to a gate 40 if neither of the above mentioned first or second comparing circuits closes the gate 39. The pulses passing through the gate 40 are supplied to the coils $L_1$, $L_2$ of the recording head 101 via an inverter 41 and gate drivers 42, 43 so that the recording head 101 produces a magnetizing force on a recording drum 102 for recording latent images of a spatial density corresponding to the voltage of the input picture signal.

An upper reference voltage $V_s+$ is derived from a circuit consisting of a voltage source $V_{cc}+$, the diode $D_1$ and the resistor $R_5$ connected to one of the inputs of the comparator 31. A lower reference voltage $V_s-$ is derived from a circuit consisting of a voltage source $V_{cc}-$, the resistor $R_9$ and diodes $D_3$, $D_2$ connected to one of the inputs of the comparator 33. The voltage source $V_{cc}+$ is common to the upper reference voltage $V_s+$ forming circuit at the input of the comparator 31, the upper limit voltage $V_l+$ forming circuit at the input of the voltage-to-frequency converter 34, the positive voltage source for the portion 15 of the voltage-to-frequency converter 34, and the current supplying circuit of the recording coils $L_1$, $L_2$.

The upper and lower limits $V_l+$, $V_l-$ of the input voltage at the input of the voltage-to-frequency converter 34 are derived from a circuit consisting of a voltage supply $V_{cc}+$, a resistor $R_{15}$ and diodes $D_6$, $D_7$, and a circuit consisting of a voltage supply $V_{cc}-$, a resistor $R_{16}$ and diodes $D_8$, $D_9$, respectively. The restriction of the input voltage within the range spanning $V_I-$ to $V_I+$ contributes to the stable operation of the voltage-to-frequency converter.

Figure 7:
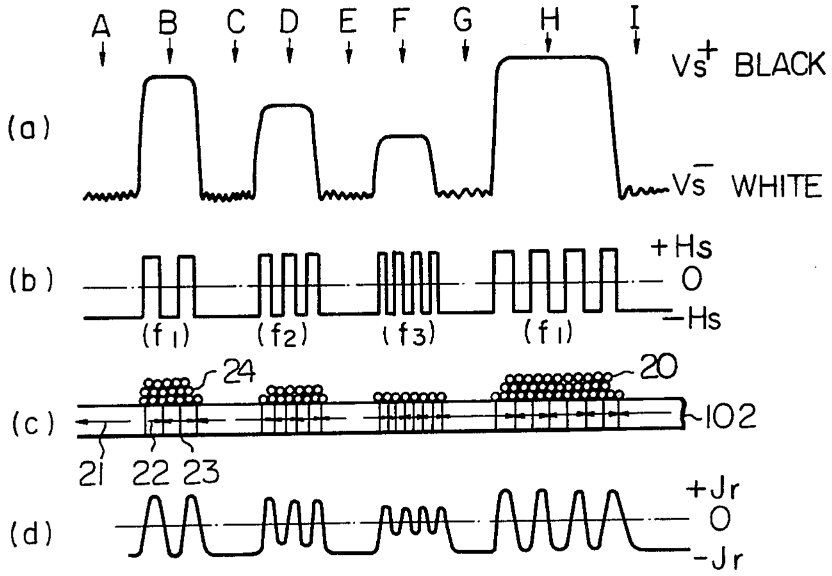
FIGS. 7(*a*) through (*d*) show the relationship between the half-tones and signals used in the circuit of FIG. 6.

FIGS. 7(*a*) through (*d*) will be referred to explain the operation of the circuit of FIG. 6 in detail.

FIG. 7(*a*) indicates a waveform of an input picture signal, changing its voltage according to the half-tones of a picture, where the abscissa represents time and the ordinate represents voltage. A black tone corresponds to a high voltage and a white tone corresponds to a low voltage. In FIG. 7(*a*), the upper and the lower reference voltages are indicated as $V_s+$ and $V_s-$, respectively; the portions A, C, E, G and I represent a white tone lower than $V_s-$; the portions B and H represent a deep black tone higher tnan $V_s+$; the portion D represents a half-tone which is close to the deep black tone but between $V_s+$ and $V_s-$, and; the portion F represents a half-tone which is rather far from the deep black tone but between $V_s+$ and $V_s-$.

In FIG. 7(*b*), the positive and negative directional magnetizing forces produced by coils $L_1$, $L_2$ of the recording head are indicated as $+H_s$ and $-H_s$, respectively. In FIG. 7(*b*) the recording frequencies $f_1$, $f_2$, $f_3$ and $f_4$ of the recording head correspond to respective portions B, D, F and H of FIG. 7(*a*), that is, frequency $f_1$ corresponds to the portions B and H, frequency $f_2$ corresponds to the portion D and frequency $f_3$ corresponds to the portion F.

FIG. 7(*c9* illustrates the pattern of residual magnetization of the recording magnetic medium 102 (in FIGS. 2 and 6) and the attraction of the magnetic toner 20, 24. As will be understood from FIG. 7(*c*) the magnetic toner is attracted to the positions where the magnetizing force changes its direction, and the amount of magnetic toner so attracted is dependent on the recording density, and thus, on the frequency of the pulses shown in FIG. 7(*b*).

FIG. 7(*d*) illustrates the intensity of the residual magnetization, the positive and negative direction of which is represented by +Jr and −JR respectively, of the magnetic recording medium 102.

Figure 8:
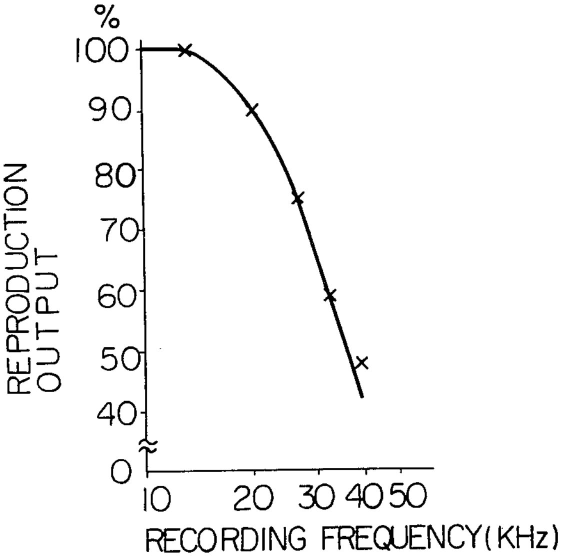
FIG. 8 and FIG. 9 are diagrams showing the results of experiments concerning the present invention.
Figure 9:
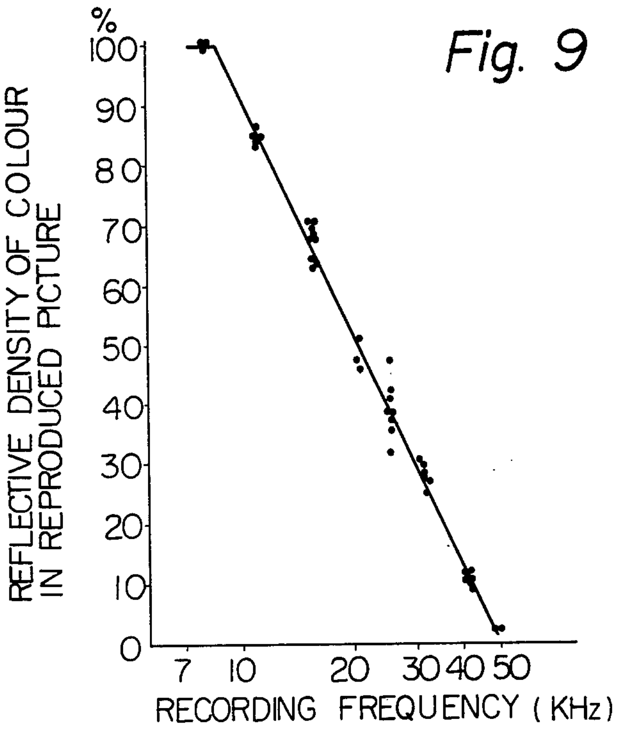

The results of experiments conducted to demonstrate the performance of the apparatus of FIG. 6 are shown in FIG. 8 and FIG. 9, in a similar manner to that of FIG. 4 and FIG. 5. The magnetic recording medium used in these experiments was the same as described in the explanation of FIG. 4 and FIG. 5. The diameter of the recording drum was 68.5 mm, and the revolution of the same was 360 RPM, in these experiments. Furthermore, as a result of these experiments, it was found that the frequency $f_1$, in FIG. 7(*b*), in terms of spatial recording density had to be higher than 6 bits/mm for a successful result.

Figure 10:
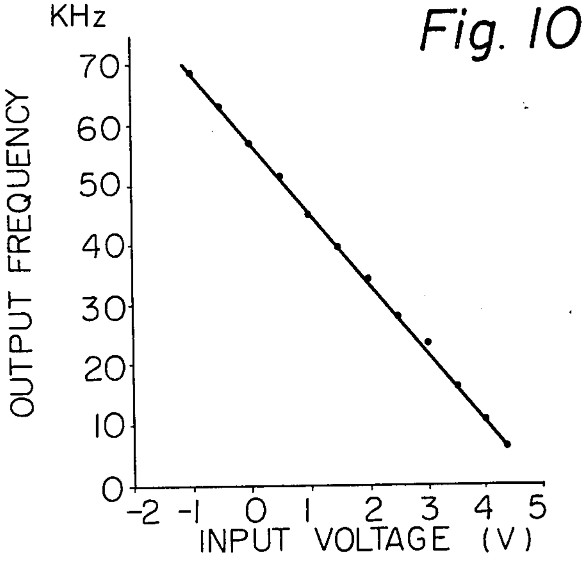
FIG. 10 shows the relationship between input voltage and frequency of the voltage-frequency converter in FIG. 6.

FIG. 10 shows an example of the relationship between the imput voltage and frequency of the voltage-to-frequency converter in FIG. 6.

With respect to the components of the electrical circuits used in the embodiments of apparatus according to the present invention, it is possible to adopt a number of known devices. For example, the Voltage-to-Frequency Converter NE-566V or SE555, of the Signetics Co., or the Voltage-to-Frequency Converter MC4024, of the Motorola Co., can be used as a portion 15 of the voltage-to-frequency converter 14 in FIG. 6. Further, the Encoder 74148 and Decoder 7442A, of the Texas Instruments Co., can be used as the encoder 16 and decoder 17 in FIG. 2, respectively.

While the preferred forms of the invention have been hereinbefore described, obviously modifications and variations are possible in light of the above teachings. For example, colours other than black or white can be dealth with, although the above described embodiments of the present invention refer only to black and white, and; a Thermomagnetography method utilizing a laser beam can be used in place of the magnetic recording on the recording medium of the above described embodiments of the present invention. It is, therefore, to be understood that within the scope of the appended claims the invention may be practiced otherwise than as specifically described hereinbefore.

What is claimed is:

1. An apparatus for recording magnetic latent images, utilizing magnetography, on a medium for recording, including:

means for discriminating the magnitude of the input signal, means, responsive to said discriminating means, for generating pulses, whose frequency is of a predetermined value, when said discriminating means detects an input signal greater than a predetermined value indicative of a black color, a voltage-to-frequency converter which produces pulses of different frequencies in accordance with the voltage of the input picture signal, whereby the value of the frequency changes in accordance with a change in the input signal corresponding to a change of color shading between black and white; and means for applying the pulses produced by either said pulse generating means or said voltage-to-frequency converter to the recording head.

2. An apparatus for recording magnetic latent images, utilizing magnetography, on a medium for recording, which comprises means for discriminating the magnitude of the input signal, a voltage-to-frequency converter which produces pulses of different frequencies in accordance with the voltage of the input picture signal, whereby a low frequency corresponds to a black color signal and the value of the frequency increases in accordance with the change of color from black to white, means for applying the pulses produced by said voltage-to-frequency converter to the recording head, and at least one of the means selected from the following A, B and C, when a signal representing a white color is smaller than a predetermined voltage:

A. means for applying direct current to the recording head;

B. means for inhibiting the application of current to the recording head, and;

C. means for applying pulses, whose frequency is higher than a predetermined value, to the recording head.

3. An apparatus for recording magnetic latent images utilizing magnetography, on a medium for recording, which comprises means for discriminating the magnitude of the input signal, means for generating pulses, whose frequency is of a predetermined value, responsive to a signal from said discriminating means representing a detected input greater than a predetermined voltage, a voltage-to-frequency converter which produces pulses of varying frequencies in accordance with the voltage of the input signal, means for selectively applying the pulses produced by said pulse generating means and said voltage-to-frequency converter to the recording head, and at least one of the means selected from the following A, B and C, when a signal is smaller than a predetermined voltage:

A. means for applying direct current to the reocrding head;

B. means for inhibiting the application of current to the recording head, and;

C. means for applying pulses, whose frequency is higher than a predetermined value, to the recording head.

* * * * *